INVENTOR.
BOHDAN HURKO
BY Brangley, Baird, Clayton, Miller & Vogel
ATTYS.

Feb. 11, 1964
B. HURKO
3,121,158
HOUSEHOLD COOKING OVENS AND METHODS OF CLEANING THE SAME
Filed Dec. 13, 1962
3 Sheets-Sheet 2
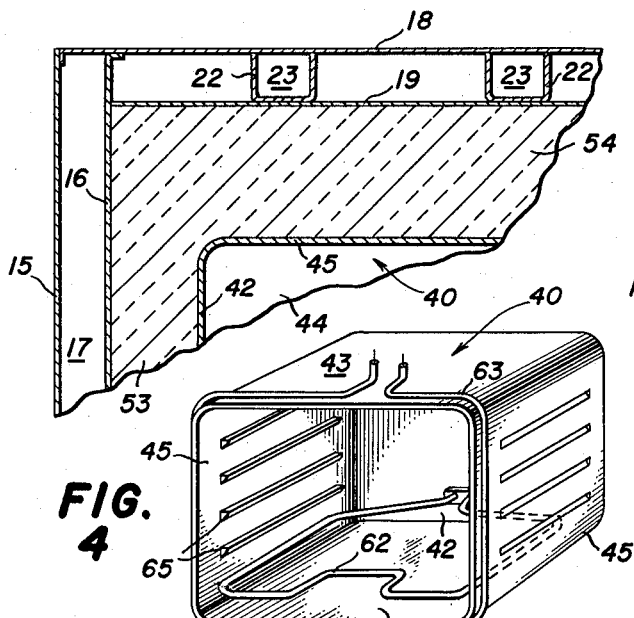
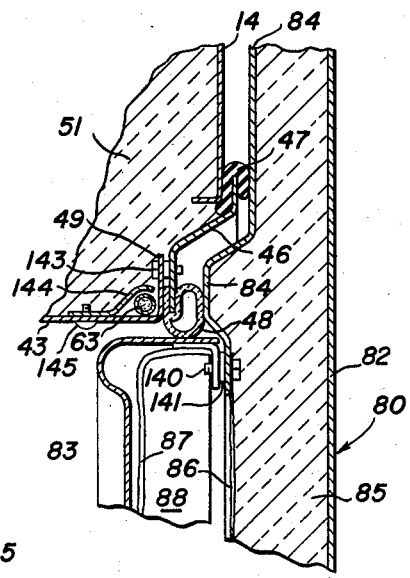
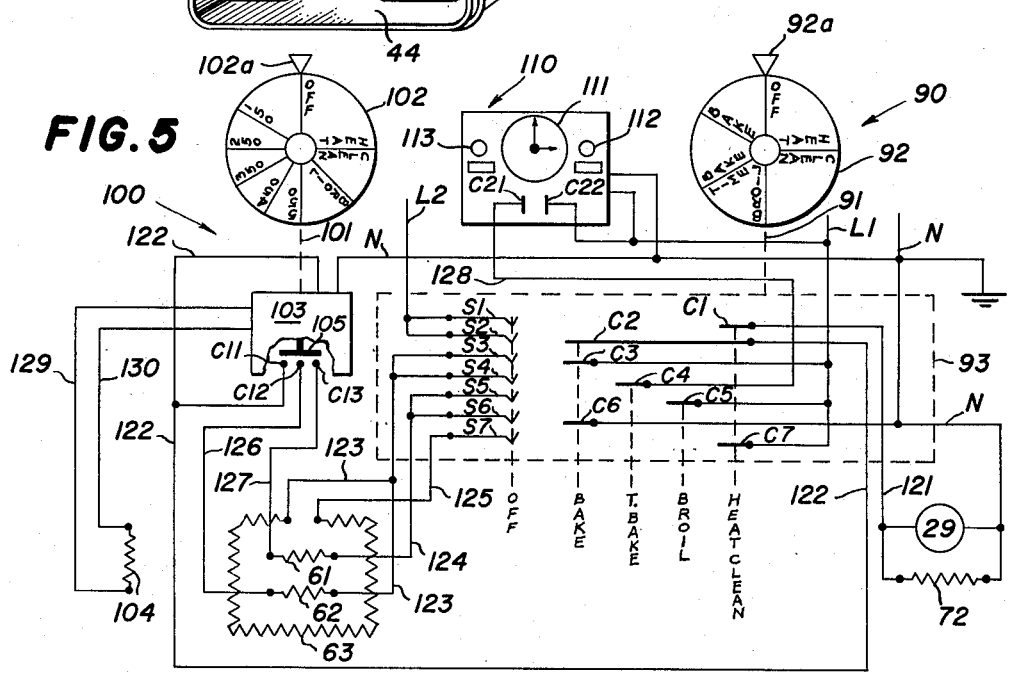
INVENTOR.
BOHDAN HURKO
BY
Prangley, Baird, Clayton,
Miller & Vogel
ATTYS.

OVEN LINER HEAT-CLEANING CYCLE

INVENTOR.
BOHDAN HURKO
BY
Prangley, Baird, Clayton,
Miller & Vogel,
ATTYS.

United States Patent Office 3,121,158
Patented Feb. 11, 1964

3,121,158
HOUSEHOLD COOKING OVENS AND METHODS
OF CLEANING THE SAME
Bohdan Hurko, Louisville, Ky., assignor to General
Electric Company, a corporation of New York
Filed Dec. 13, 1962, Ser. No. 244,493
40 Claims. (Cl. 219—35)

The present invention relates to household cooking ovens and to methods of heat-cleaning the same. This application comprises a continuation-in-part of the copending application of Bohdan Hurko, Serial No. 27,926, filed May 9, 1960, now abandoned.

It is a general object of the present invention to provide a method of cleaning from the interior surfaces of an oven liner defining an oven cavity food soils accumulated thereupon during the previous carrying out in the oven cavity of normal food cooking operations in the normal food cooking temperature range extending from about 150° F. to about 550° F., wherein the inner liner is enclosed by and heat-insulated from an outer casing, and wherein the method essentially involves the step of supplying into the oven cavity during a sufficiently short time interval sufficient heat to elevate the temperature of the inner liner into the heat-cleaning temperature range extending from about 750° F. to about 950° F., but not thereabove, without elevating the temperature of the outer casing above 194° F.

Another object of the invention is to provide a heat-cleaning method of the character noted, wherein the inner liner is cleaned in situ, thereby rendering it unnecessary to provide in the oven complicated structure accommodating the removal of the inner liner from the enclosing outer casing.

Another object of the invention is to provide a heat-cleaning method of the character noted, wherein the steps therein involved are altogether automatically carried out from the standpoint of the cook.

Another object of the invention is to provide a heat-cleaning method of the character noted, wherein the food soils mentioned are removed from the interior surfaces of the inner liner fundamentally by degrading the same with the production of corresponding gaseous degradation products, and wherein the gaseous degradation products mentioned are exhausted to the exterior of the oven cavity as they are produced so as to prevent any subsequent substantial condensation thereof upon the interior surfaces of the inner liner.

Another object of the invention is to provide a heat-cleaning method of the character noted, wherein the food soils mentioned are removed from the interior surfaces of the inner liner fundamentally by a pyrolytic step, with the consequent production of gaseous primary degradation products, and wherein the gaseous primary degradation products mentioned are then subjected to oxidation so as to produce corresponding gaseous secondary degradation products substantially completely devoid of carbon monoxide, and wherein the gaseous secondary degradation products mentioned are then exhausted from the outer casing of the oven.

Another object of the invention is to provide a heat-cleaning method of the character noted, which is carried out, without ignition of the food soils mentioned, and without ignition of the gaseous primary and secondary degradation products mentioned.

Another object of the invention is to provide a heat-cleaning method of the character noted, wherein the heat is supplied to the oven cavity both at a controlled rate and in a controlled quantity during the short time interval of the heat-cleaning operation.

A further object of the invention is to provide a household cooking oven comprising a substantially box-like metal inner liner defining a cooking cavity therein having a volume in the general range 2 to 4 cubic feet (usually about 3 cubic feet) and provided with an open front, a substantially box-like metal outer casing enclosing the inner liner and spaced outwardly therefrom and also provided with an open front surrounding the open front of the inner liner, heat-insulating breaker structure joining the front of the inner liner and the front of the outer casing, fibrous glass heat-insulating material disposed in the space between the walls of the inner liner and the walls of the outer casing, rear flue structure arranged between the rear wall of the outer casing and the heat-insulating material for the rear wall of the inner liner, side flue structures respectively arranged between the side walls of the outer casing and the heat-insulating material for the side walls of the inner liner, a blower operative to circulate ambient air from the exterior downwardly through the rear flue structure and thence upwardly through both of the side flue structures and back to the exterior, facility for controlling the operation of the blower, a heat-insulated front door operatively associated with the front opening into the cooking cavity and selectively movable between open and closed positions with respect thereto, gasket structure substantially sealing the front opening into the cooking cavity when the front door occupies its closed position, facility for supplying heat into the cooking cavity, and facility for controlling the heat-supplying facility to preset the temperature within the cooking cavity when the front door occupies its closed position either in a normal cooking temperature range extending from about 150° F. to about 550° F. or in a heat-cleaning temperature range extending from about 750° F. to about 950° F., wherein the fibrous glass heat-insulating material has a density and a thickness such that continuous operation of the cooking cavity in the normal cooking temperature range and in the absence of operation of the blower does not cause elevation of the temperature of any wall of the outer casing above about 130° F. in 70° F. ambient air and such that operation of the cooking cavity in the heat-cleaning temperature range concurrently with operation of the blower and throughout a time interval in excess of 2 hours does not cause elevation of the temperature of the side walls of the outer casing above 194° F. in 70° F. ambient air.

A still further object of the invention is to provide a household cooking oven comprising substantially box-like heat-insulated cabinet structure defining a cooking cavity therein having a volume of about 3 cubic feet and provided with an open front, a heat-insulated front door operatively associated with the front opening into the cooking cavity and selectively movable between open and closed positions with respect thereto, gasket structure substantially sealing the front opening into the cooking cavity when the front door occupies its closed position, facility for supplying heat into the oven cavity, and facility for controlling the heat-supplying facility to preset the temperature within the cooking cavity when the front door occupies its closed position either in a normal cooking temperature range extending from about 150° F. to about 550° F. or in a heat-cleaning temperature range extending from about 750° F. to about 950° F.; wherein the front door includes an inner metal sheet and an outer metal sheet arranged in spaced-apart relation, heat-insulating breaker structure joining the perimeters of the front door sheets, and fibrous glass heat-insulating material disposed in the space arranged between the front door sheets, wherein the fibrous glass heat-insulating material has a density and a thickness and a low overall thermal conductivity such that continuous operation of the cooking cavity in the normal cooking temperature range does not cause elevation of the temperature of the outer front door sheet above about 130° F. in 70° F. ambient air and such that operation of the cooking cavity in the heat-cleaning temperature range throughout a time interval in excess of 2 hours does not cause elevation of the temperature of the outer front door sheet above about 160° F. in 70° F. ambient air.

A still further object of the invention is to provide a household cooking oven of the character described, wherein the fibrous glass heat-insulating material incorporated in the cabinet structure thereof and incorporated in the front door thereof is characterized by a density in the general range 3 to 5 pounds per cubic foot.

Yet another object of the invention is to provide a household electric range comprising an oven of the character described, whereby the range is characterized by "cool-cooking" during the carrying out of cooking operations in the oven thereof in the normal cooking temperature range mentioned in that the surface temperatures of the outer walls of the cabinet thereof and of the outer sheet of the front door thereof do not exceed a temperature of about 130° F. in 70° F. ambient air, thereby to prevent "heating-up" of a kitchen in which the range is located.

Still another object of the invention is to provide a household electric range comprising an oven of the character described and including the "heat-cleaning" facility of the character described, whereby the range is characterized by "warm-heat-cleaning" during the carrying out of the "heat-cleaning" operation in the oven thereof in the heat-cleaning temperature range mentioned in that the surface temperatures of the outer side walls of the cabinet do not exceed a temperature of 194° F. in 70° F. ambient air, and the surface temperature of the outer sheet of the front door thereof do not exceed a temperature of 160° F. in 70° F. ambient air, thereby to prevent undue "heating-up" of a kitchen in which the range is located.

A still further object of the invention is to provide a household electric range comprising an upstanding body, a substantially horizontal cooking top carried by the top of said body, first structure defining a heat-insulated oven cavity in the body and disposed below the cooking top and provided with a front opening, the first structure including a layer of heat-insulating material arranged between the top wall of the oven cavity and the cooking top, second structure defining a flue from the top of the oven cavity through the layer of heat-insulating material mentioned and thence through the cooking top to the exterior, a catalytic oxidizing unit arranged in the flue and embedded in the layer of heat-insulating material mentioned, and a heat-insulated front door carried by the front of the body and selectively movable between open and closed positions with respect to the front opening into the oven cavity.

Further features of the invention pertain to the particular arrangement of the steps of the method and of the elements of the range, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 2 is a greatly enlarged fragmentary plan view in section of one rear-side corner of the range of FIG. 1;

FIG. 3 is a greatly enlarged fragmentary vertical sectional view of the top-front of the range of FIG. 1;

FIG. 4 is a reduced front perspective view of the metal inner liner incorporated in the oven of the range of FIG. 1;

FIG. 5 is a diagrammatic illustration of the electric control system for the range of FIG. 1;

Figure 1:
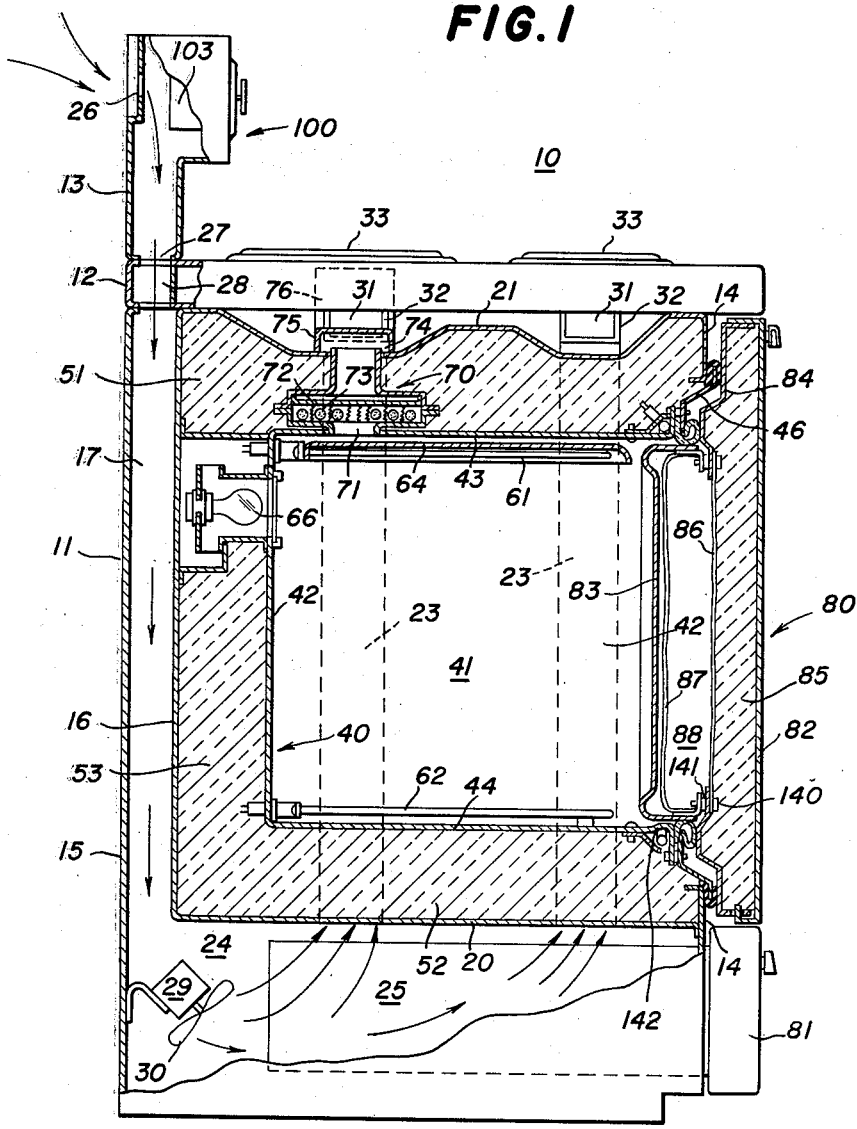
FIGURE 1 is a side elevational view, partly broken away and partly in section, of a household electric range embodying the present invention and in which the method of the present invention may be carried out.

Referring now to FIGS. 1 to 4, inclusive, of the drawings, there is illustrated a household electric range 10 embodying the features of the present invention and in which the method of the present invention may be carried out. More particularly, the range 10 comprises an upstanding substantially box-like metal body 11 carrying a substantially horizontal metal cooking top 12 and an upstanding metal backsplash 13 arranged at the rear of the cooking top 12. The body 11 constitutes a shell or casing and includes a front wall 14, an outer rear wall 15, an inner rear wall 16 spaced forwardly of the outer rear wall 15 and defining a rear flue 17 therebetween, a pair of outer side walls 18, a pair of inner side walls 19 respectively spaced inwardly of the outer side walls 18, a bottom wall 20, and a top wall 21. A pair of channels 22 are arranged between each of the side wall pairs 18, 19 to provide a pair of upstanding side flues 23 therebetween, as best shown in FIG. 2. Also, the body 11 comprises a supporting base, not shown, positioned well below the bottom wall 20 and defining a drawer space 24 therebetween. The lower portion of the front wall 14 has an opening therein that receives a removable drawer 25 that normally occupies a closed position disposed in the drawer space 24, as best shown in FIG. 1.

The backsplash 13 is of hollow structure and comprises a rear air inlet opening 26 in the top rear wall 13 thereof and a communicating air outlet opening 27 in the bottom thereof; and similarly, the cooking top 12 is of hollow structure and comprises an air passage 28 through the rear portion thereof and communicating between the air outlet opening 27 and the top of the rear flue 17. The bottom of the rear flue 17 communicates with the rear of the drawer space 24; and a fan or blower motor 29 is supported by the outer rear wall 15 within the rear top portion of the drawer space 24; which motor 29 is of the electric type provided with an operating shaft carrying a fan, indicated at 30 in FIG. 1. The bottom ends of the side flues 23 communicate with the top side portions of the drawer space 24; the top ends of the four rear side flues 23 respectively communicate with four top flues 31; which four top flues 31 are respectively defined by four transversely extending channel members 32 arranged between the top wall 21 and the cooking top 12; and which top flues 31 communicate with the interior of the cooking top 12. The cooking top 12 has a number of openings (ordinarily four) therein, in which a corresponding number of surface heating units 33 are removably arranged.

In view of the foregoing, it will be understood that when the electric motor 29 is operated, the fan 30 draws ambient air into the air inlet opening 26, that this air passes downwardly through the backsplash 13 and thence through the openings 27 and 28 into the top of the rear flue 17 and downwardly therethrough into the rear of the drawer space 24. The air in the drawer space 24 is then circulated upwardly through the side flues 23 and thence inwardly through the top flues 31 and below the cooking top 12, whereby the air escapes from below the cooking top 12 through the surface heating units 33 back to the exterior. This circulation of air through the rear flue 17, the side flues 23 and the top flues 31 is employed for a cooling purpose more fully explained hereinafter.

A substantially box-shaped metal liner 40 is housed in the upper portion of the body 11; which liner 40 defines an oven cooking cavity 41 therein; and which liner 40 comprises a rear wall 42, a top wall 43, a bottom wall 44 and a pair of side walls 45, as best shown in FIG. 4. The interior surfaces of the liner 40 may be finished in any conventional manner, such, for example, as by carrying a layer of porcelain enamel of the glass-frit type, not shown. A front opening is provided in the front wall 14, and an aligned front opening is provided in the liner 40, whereby the interior of the oven cooking cavity 41 is accessible from the front of the body 11 through the two front openings mentioned. In the arrangement, the front opening provided in the front wall 14 surrounds the front opening provided in the liner 40; and heat-insulating breaker structure is provided therebetween. Specifically, this arrangement includes, as best shown in FIG. 3, a substantially Z-shaped metal breaker frame 46, an outer surrounding gasket 47 formed of silicone rubber, or the like, and positioned between the outer flange of the breaker frame 46 and the front wall 14, and an inner surrounding gasket 48 formed of a suitable heat-insulating material, such as a woven fabric of glass fibers, and positioned between the inner flange of the breaker frame 46 and a surrounding flange 49 carried by the front of the liner 40.

The liner top wall 43 is spaced well below the cabinet top wall 21 and heat-insulated therefrom by a batt 51 of fibrous glass arranged in compression therebetween; the liner bottom wall 44 is spaced well above the cabinet bottom wall 20 and heat-insulated therefrom by a batt 52 of fibrous glass arranged in compression therebetween; the liner rear wall 42 is spaced well forwardly of the casing inner rear wall 16 and heat-insulated therefrom by a batt 53 of fibrous glass arranged in compression therebetween; and the liner side walls 45 are respectively spaced well inwardly of the casing inner side walls 19 and respectively insulated therefrom by a pair of batts 54 of fibrous glass respectively arranged in compression therebetween. In the arrangement, the front portions of the batts 51, 52 and 54 respectively engage the corresponding portions of the breaker frame 46, as well as the adjacent portions of the casing front wall 14 surrounding the front opening thereinto; whereby the liner 40 is exceedingly well heat-insulated from the body 11. In the structure of the heat-insulation, the batts, 51, 52, 53 and 54 may be formed either separate from each other or in part integral with each other in accordance with conventional practice in the heat-insulating of the oven liner 40, whereby the individual references to the several batts has been made only in the interest of a definite description of the locations thereof.

An upper or broil electric heating unit 61 is removably arranged in the upper portion of the oven cavity 41 adjacent to the liner top wall 43; a lower or bake electric heating unit 62 is removably arranged in the lower portion of the oven cavity 41 adjacent to the liner bottom wall 44; and a substantially loop-like electric heating unit 63 is arranged in surrounding relation with the exterior front portion of the liner 40 immediately rearwardly of the surrounding front flange 49 carried thereby, as best shown in FIGS. 3 and 4; which heating unit 63 is employed in a heat-cleaning operation described more fully hereinafter. Also, the broil heating unit 61 carries the usual heat reflector 64 positioned thereabove and below the liner top wall 43. Further, an oven lamp 66 may be arranged in the rear batt 53 for the purpose of illuminating the interior of the oven cavity 41 in a conventional manner. Furthermore, the opposite side walls 45 of the liner carry the usual tiers of horizontally aligned shelf-supporting bosses 65, as best shown in FIG. 4; which bosses 65 support one or more removable shelves, not shown, in the oven cavity 41 in the usual manner.

Figure 6:
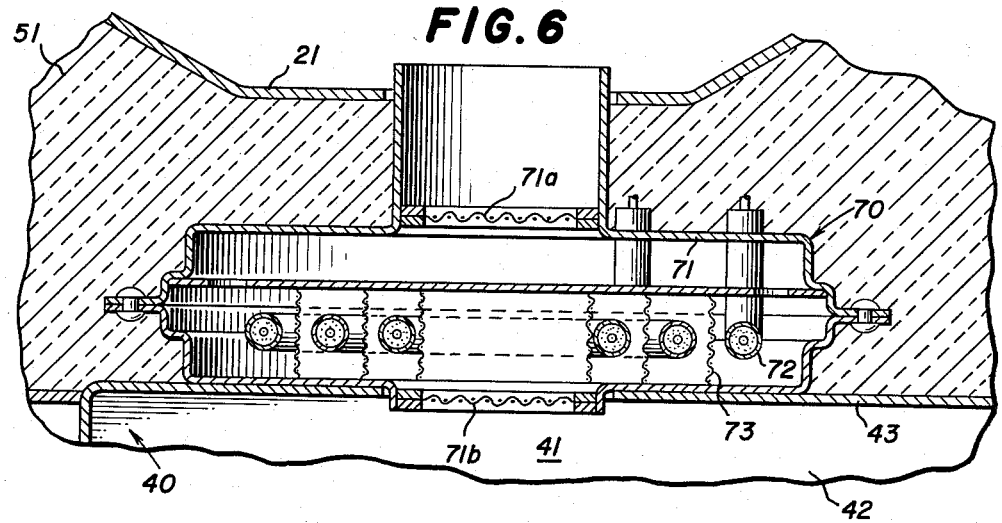
FIG. 6 is an enlarged vertical sectional view of the catalytic oxidation unit that is incorporated in the range of FIG. 1.

As best shown in FIGS. 1 and 6, a catalytic oxidizing unit 70 is embedded in the top batt 51; which unit 70 is preferably of the construction and arrangement of that disclosed in U.S. Patent No. 2,900,483, granted on August 18, 1959, to Stanley B. Welch. The unit 70 is employed for a purpose more fully explained hereinafter, and essentially comprises a casing 71 constituting a flue communicating between the top of the oven cavity 41 and the space below one of the surface heating units 33 carried by the cooking top 12. Housed within the casing 71 is an electric heating element 72 and a wire screen 73 that is coated with a catalytic material, such, for example, as platinum, that is especially adapted to promote the oxidation of carbon and carbon compounds so as to eliminate smoke, carbon monoxide, and other objectionable products exhausted from the oven cavity 41, as explained more fully hereinafter. The outlet from the top of the casing 71 of the unit 70 communicates with a flue 74 defined by a channel 75 and communicating with a stack 76 terminating below one of the rear surface heating units 33, as best shown in FIG. 1.

Further, the range 10 comprises a front door 80 that is mounted upon the front of the body 11 by hinge structure, shown, and movable about the lower edge thereof between a substantially horizontal open position and a substantially vertical closed position with respect to the open front of the oven cavity 41. When the front door 80 occupies its closed position, as shown in FIG. 1, the top edge thereof is positioned below the front of the cooking top 12 and the bottom edge thereof is positioned above the top of a front panel 81 carried by the front end of the drawer 25 with the drawer 25 in its normally closed position within the drawer space 24. Moreover, the outer edge of the cooking top 12, the front or outer wall of the front door 80 and the front or outer wall of the drawer panel 81 are arranged in vertical alignment or flush condition, so as to lend a finished appearance to the front of the range 10.

More specifically, the front door 80 includes a metal outer sheet 82, a metal inner sheet 83 spaced well inwardly of the outer sheet 82, and a metal inner boundary frame 84. The outer sheet 82 carries an in-turned rim about the perimeter thereof that is secured to an out-turned rim carried by the outer perimeter of the inner boundary frame 84; and a batt 85 of fibrous glass is arranged in compression between the out sheet 82 and the inner boundary frame 84 and between the outer sheet 82 and inner sheet 83. The inner perimeter of the inner boundary frame 84 is suitably secured to an out-turned flange carried about the perimeter of the inner sheet 83; and also one or more sheets 86 of bright aluminum foil are arranged adjacent to the inner side of the batt 85 and one or more sheets 87 of bright aluminum foil are arranged adjacent to the outer side of the inner sheet 83, whereby the sheets 86 and 87 cooperate to define an air pocket 88 therebetween. Thus, the batt 85, the foil sheets 86 and 87, the air pocket 88 and the inner boundary frame 84 cooperate to heat-insulate the inner and outer sheets 83 and 82 from each other. Also, when the front door 80 occupies its closed position, as shown in FIG. 1, the inner boundary frame 84 is disposed forwardly of the cabinet front wall 14 and out of contact therewith and substantially sealed thereto by the outer gasket 47 positioned therebetween and the inner sheet 83 projects well inwardly into the open front of the liner 40. Further, the inner gasket 48 is substantially sealed mutually to the liner front flange 49, to the breaker frame 46, to the inner boundary frame 84, and to the out-turned flange carried about the perimeter of the inner sheet 83.

Figure 8:
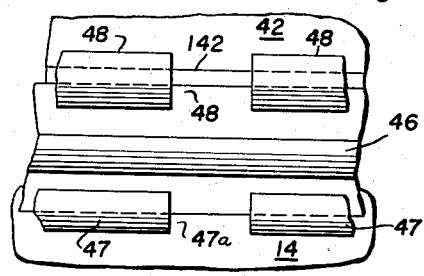
FIG. 8 is a greatly enlarged fragmentary front view of the lower central portion of the body of the range with the front door in its open position.

At this point it is noted that the front door 80 in its closed position with respect to the front of the body 11 substantially completely seals the front opening into the oven cavity 41 about the entire perimeter thereof, except for a distinct narrow control air passage that is formed through the bottom central portions of the gaskets 47 and 48, so as to provide an air passage from the front of the drawer space 24 between the central portions of the breaker frame 46 and the inner boundary frame 84 and into the front central bottom portion of the oven cavity 41. This constructional detail is illustrated in FIG. 8, wherein the distinct narrow control air passage is formed through the gap 47a provided in the gasket 47 and through the gap 48a provided in the gasket 48. This arrangement allows a small and controlled amount of ambient air to be supplied from the top front of the drawer space 24 and into the bottom front of the oven cavity 41 and thence upwardly through the oven cavity 41 and then through the casing 71 of the unit 70 and via the top flue 74, the stack 76 and the rear surface unit 33 and back to the exterior; which arrangement is utilized for a purpose more fully described hereinafter.

Further, the range 10 comprises, as shown in FIG. 5, an electric control network, including a 3-wire Edison source of power supply of 236 volts, single phase, 60-cycles, A.-C., provided with a pair of outside line conductors L1 and L2 and a grounded neutral conductor N. Also, the network includes a manually operable selector switch 90, a manually settable temperature controller 100 and a clock-controlled timer 110, all mounted in the backsplash 13 and readily accessible from the front thereof to the cook.

As illustrated, the selector switch 90 comprises a rotatable operating shaft 91 carrying a manually operable dial 92 on the outer end thereof and a switching drum 93 on the inner end thereof. The dial 92 comprises a skirt carrying indicia that correspond to the control positions of the selector 90 and that cooperate with an associated index marker 92a. Specifically, the skirt of the dial 92 carries the indicia "off," "bake," "time-brake," "broil" and "heat-clean" disposed angularly thereabout. The drum 93 carries contact structure C1 to C7, inclusive, disposed angularly thereabout and respectively cooperating with stationary switch springs S1 to S7, inclusive, in the usual drum-controller array.

The temperature controller 100 is preferably of the fundamental construction and arrangement of the King-Seeley automatic temperature control device, now shown in U.S. Patent No. 2,962,575, granted on November 29, 1960, to Harry I. Baker; which temperature controller 100 comprises a rotatable operating shaft 101 carrying a manually operable dial 102 on the outer end thereof and a control device, not shown, on the inner end thereof, the control device mentioned being housed in a casing, indicated at 103. The dial 102 comprises a skirt carrying indicia that correspond to the control positions of the control device mentioned and that cooperate with an associated index marker 102a. Specifically, the skirt of the dial 102 carries the indicia "off," "150," etc., "550," "broil" and "heat-clean." The indicia "150," etc., have reference to ° F.; whereby the normal cooking temperature range of the controller 100 embraces the range 150° F. to 550° F. The "broil" trip of the controller 100 is at approximately 600° F.; and the "heat-clean" trip of the controller is at approximately 880° F. that is within the heat-cleaning range extending from about 750° F. to about 950° F., as explained more fully hereinafter. Further, the controller 100 comprises a temperature sensing resistor 104 that is operatively associated with the oven cavity 41 and subject to the temperature therein in the usual manner. Also, the controller 100 comprises a contactor, not shown, housed in the casing 103 and provided with a contact bridging member 105 that simultaneously governs three contacts C11, C12, and C13, illustrated.

The timer 110 is of conventional connection and arrangement, including a clock proper 111 of the synchronous motor type, preferably a "Telechron," a pair of master control contacts C21, C22, a "time-to-stop" manually settable knob 112 and a "cooking-time" manually settable knob 113 of the usual form. Since the timer 110 is entirely conventional, it is only necessary to note that the master contacts C21, C22 are normally open. When the timer is set, the master contacts C21, C22 are closed at a clock time interval set by the knob 113 and preceding the clock time to stop, and the master contacts C21, C22 are reopened at the clock time to stop set by the knob 112.

In the circuit network: the contacts C1 and C2 respectively terminate two conductors 121 and 122; the contacts C3, C5 and C7 commonly terminate the line conductor L1; and the contact C6 terminates the neutral conductor N. The switch springs S1 and S2 commonly terminate the line conductor L2; the switch springs S3 and S4 commonly terminate a conductor 123; the switch springs S5 and S6 commonly terminate a conductor 124; and the switch spring S7 terminates a conductor 125. The contacts C11, C12 and C13 respectively terminate the conductor 122, a conductor 126 and a conductor 127. The contacts C21 and C22 respectively terminate a conductor 128 and the line conductor L1. The temperature sensing resistor 104 is bridged across a pair of conductors 129, 130 that are connected to control apparatus, not shown, housed in the casing 103; the broil unit 61 is bridged across the conductors 124, 127; the bake unit 62 is bridged across the conductors 123, 126; the look-like unit 63 is bridged across the conductors 123, 125; and the blower motor 29, and the heating element 72 incorporated in the catalytic oxidizing unit 70, are bridged in parallel relation across the conductor 121 and the neutral conductor N. The timer motor, not shown, in the timer 110 is connected across the line conductor L1 and the neutral conductor N; the circuit network of the temperature controller 100 that is housed in the casing 103 is connected across the neutral conductor N and the conductor 122; and the sensing resistor 104 is operatively connected into the circuit network of the temperature controller 100 by the pair of conductors 129 and 130.

Considering now the general mode of operation of the circuit network, when the selector 90 occupies its "off" position, all of the circuits are open. When the selector switch 90 occupies any one of its positions, other than its "off" position, the line conductor L2 is connected via the switch spring S2 and the engaged contact C2 to the conductor 122 extending to the circuit network of the temperature controller 100 that is housed in the casing 103; whereby the temperature controller 100 is rendered operative to match the temperature of the oven cavity 41 as sensed by the temperature sensing resistor 104 against the temperature preset by the particular set position of dial 102, and then correspondingly to actuate the contact bridging member 105 housed in the casing 103 either into its closed position or into its open position with respect to the associated contacts C11, C12 and C13, as required by the mismatch or match of the two temperatures mentioned. When the selector switch 90 occupies its "bake" position, a circuit is prepared for energizing the bake unit 62 across the line conductors L1 and L2, and a circuit is prepared for energizing the broil unit 61 across the line conductor L2 and the neutral conductor N; which circuits are selectively closed and opened by the contact bridging member 105 incorporated in the temperature controller 100. Specifically, when the cook sets the dial 92 of the selector switch 90 into its "bake" position, she also sets the dial 102 of the temperature controller into a temperature setting corresponding to that at which the baking operation is to be carried out. When the temperature sensing resistor 104 senses a temperature in the oven cavity 41 below that preset by the dial 102, the contact bridging member 105 is actuated into its closed position with respect to the contacts C11, C12 and C13, whereby the circuits mentioned for energizing the bake unit 62 and the broil unit 61 are completed. When the temperature sensing resistor 104 senses a temperature in the oven cavity 41 corresponding to that preset by the dial 102, the contact bridging member 105 is actuated into its open position with respect to the contacts C11, C12 and C13, whereby the circuits mentioned for energizing the bake unit 62 and the broil unit 61 are interrupted. Thus, the temperature controller 100 holds the temperature in the oven cavity 41 that is preset by the dial 102, when the selector switch 90 occupies its "bake" position.

In order to carry out a time-brake operation in the oven cavity 41, the cook sets the time-to-stop knob 112 and the time-to-start knob 113 on the timer 110, sets the dial 102 of the temperature controller 100 into the desired bake temperature, and sets the dial 92 of the selector switch 90 into its "time-bake" position. In its "time-bake" position, the selector switch 90 prepares a circuit for energizing only the bake unit 62 across the line conductors L1 and L2; which circuit mentioned is initially closed and later opened by the master contacts C21, C22 in the timer 110 at proper start and start clock times as preset as a consequence of setting of the knobs 112 and 113; and which circuit mentioned is selectively closed and opened by the temperature controller 100 at the contact bridging member 105 in order to hold the temperature in the oven cavity 41 at that preset by the dial 102 in the manner previously described.

In order to carry out a broil operation in the oven cavity 41, the cook sets the dial 102 of the temperature controller 100 into its "broil" position, and sets the dial 92 of the selector switch 90 into its "broil" position. When the selector switch 90 is operated into its "broil" position, a circuit is completed for energizing the broil unit 61 across the line conductors L1 and L2; which circuit mentioned is not ordinarily interrupted by the contact bridging member 105 in the temperature controller 100, since the "broil" setting of the dial 102 of the temperature controller 100 corresponds to a temperature in the oven cavity 41 of about 600° F. However, in the event the temperature sensing resistor 104 senses such high temperature in the oven cavity 41, the contact bridging member 105 is actuated into its open position with respect to the contact C11, C12 and C13 in the manner previously described. Thus in this case the temperature controller 100 holds the temperature of 600° F. in the oven cavity 41 that is preset by the dial 102 in its "broil" position, in the manner previously described.

In order to carry out a heat-cleaning operation in the oven cavity 41, the cook sets the dial 102 of the temperature controller 100 into its "heat-clean" position, and sets the dial 92 of the selector switch 90 into its "heat-clean" position. The "heat-clean" position of the dial 102 of the temperature controller 100 corresponds to a temperature in the oven cavity of approximately 880° F. When the selector switch 90 is operated into its "heat-clean" position a first circuit is completed for energizing in series relation the loop-like unit 63 and the bake unit 62 across the line conductors L1 and L2, and a second circuit is completed for energizing in parallel relation the blower motor 29 and the heating unit 72 incorporated in the catalytic oxidizing unit 70 across the line conductor L2 and the neutral conductor N. The first circuit mentioned extends from the line conductor L1 via the contact C7 the engaging switch spring S7, the conductor 125, the loop-like unit 63, the conductor 123, the bake unit 62, the conductor 126, the contact C12, the closed bridging member 105, the contact C11, the conductor 122, the contact C2 and the engaging switch spring S2 to the line conductor L2. Of course, this series first circuit includes the bridging member 105, whereby the temperature controller 100 is operative to hold the temperature in the oven cavity 41 at 880° F. corresponding to the preset "heat-clean" position of the dial 102, in the manner previously described. The second circuit mentioned extends from the neutral conductor N via the blower motor 29 and the heating unit 72 to the conductor 121, and thence via the contact C1 and the engaging switch spring S1 to the line conductor L2. The operation of the blower motor 29 effects operation of the blower or fan 30 and the consequent circulation of ambient air through the flues 17, 23 and 31 in the manner previously described; while the energization of the heating unit 72 renders operative the catalytic oxidizing unit 70 for a purpose more fully explained hereinafter.

Also, the control circuit may advantageously incorporate a safety door latch interlock circuit, not shown, of the character of that disclosed in U.S. Patent No. 3,050,048, granted on August 21, 1962, to George A. Scott.

In a constructional example of the range 10, more fully described hereinafter, the oven cavity 41 has a volume of approximately 3 cubic feet, whereby the heat-production capacities of the units 61, 62 and 63 are properly correlated to achieve the desired heating effects mentioned above. Specifically, in the "bake" position of the selector switch 90, the bake unit 63 is energized across 236 volts, A.-C., producing heat at a rate of about 3000 watts, and the broil unit 61 is energized across 118 volts, A.-C., producing heat at a rate of about 750 watts; whereby the heat supplied to the oven cavity 41 for the bake operation is at a rate of about 3750 watts. In the "time-bake" position of the selector switch 90 only the bake unit 62 is energized across 236 volts, A.-C., producing heat at a rate of about 3000 watts; whereby the heat supplied to the oven cavity 41 for the time-bake operation is at a rate of about 3000 watts. In the "heat-clean" position of the selector switch 90 the two units 62 and 63 are energized in series relation across 236 volts, A.-C., whereby the bake unit 62 produces heat at a rate of about 2240 watts and the loop-like unit 63 produces heat at a rate of about 360 watts, with the result that the heat supplied to the oven cavity 41 for the heat-cleaning operation is at a rate of about 2600 watts. In passing it is mentioned that this supply of heat to the oven cavity 41 at the rate of 2600 watts comprises the supply thereto of 147 B.t.u. per minute or about 8900 B.t.u. per hour. Specifically, the rate of heat supply to the oven cavity 41 in the heat-cleaning operation should fall in the general range 120 to 180 B.t.u. per minute in order to achieve best results, as explained more fully hereinafter. In passing it is mentioned that the energization of the heating unit 72 in the heat-cleaning operation is effective to supply heat thereto at a rate appropriate to cause the surface temperature thereof to be maintained at approximately 1300° F. in the gentle air stream passing therethrough from the oven cavity 41 in the manner previously explained.

Considering now the general principle of the present heat-cleaning method, during the normal use of the oven cavity 41 in carrying out baking and broiling operations food soils accumulate upon the interior surfaces of the liner 40 and the interior surface of the inner sheet 83 of the front door 80, which interior surfaces are hereinafter referred to as boundary surfaces, and these food soils are exceedingly difficult to remove or clean from the boundary surfaces of the oven cavity 41 by ordinary scrubbing, washing, and like actions due to the nature of such food soils. More particularly, such food soils fundamentally comprise proteins, fats, fatty acids, and carbohydrates. Proteins are made up largely of amino-acids, such as glycine, alanine, cystine, etc.; and fats essentially comprise the esters of the corresponding fatty acids. Fatty acids are normally classified as saturated and unsaturated. Saturated fatty acids include the typical acids: capric, lauric, palmitic, stearic, etc.; and unsaturated fatty acids include the typical acids: palmitoleic, oleic, linoleic, etc. Carbohydrates are normally classified as monosaccharides (glucose, fructose, etc.) and polysaccharides (sucrose, lactose, starch, cellulose, etc.).

Figure 7:
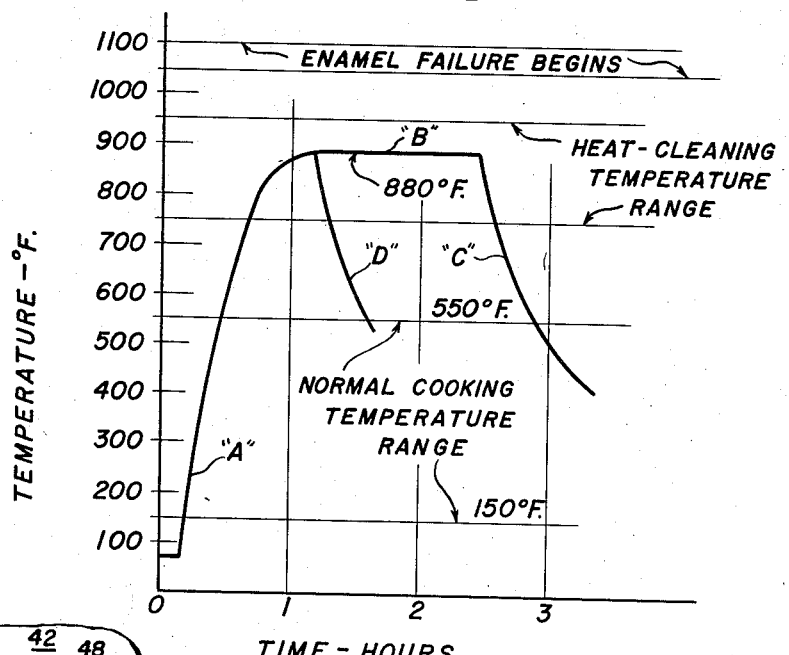
FIG. 7 is a graphic illustration of the temperature-time relationship involved in a heat-cleaning cycle of the oven of the range of FIG. 1 in accordance with an example of the present method.

It has now been discovered that this whole complex range of compounds of which food soils are composed may be decomposed or degraded by heat during a short time interval of about 2 hours in the heat-cleaning range extending from about 750° F. to about 950° F., with the production of a substantial range of gaseous degradation products, including methane, ethane, water vapor, carbon dioxide, some free carbon, etc.; and the method will best be understood by reference to the curves "A," "B" and "C" of FIG. 7. It may be assumed that the range 10 is at ambient temperature in a kitchen in 70° F. air. The heat-cleaning cycle is then initiated in the manner previously described, whereby the boundary surfaces of the oven cavity 41 reach the temperature of about 880° F. in a time interval of about 1 hour, as indicated by the curve "A." The heat-cleaning cycle then proceeds for an additional time interval of about 1 hour and 20 minutes, as indicated by the curve "B," whereupon the selector switch 90 and the temperature controller 100 are returned back into their "off" positions, whereby the temperature of the boundary surfaces of the oven cavity 41 begin to subside, this temperature falling to about 500° F. at the conclusion of about 3 hours, as indicated by the curve "C." Thus, the boundary surfaces of the oven cavity 41 are at a temperature within the heat-cleaning temperature range throughout a time interval of about 2 hours. Of course, during the total time interval of 3 hours (½ hour heating-up, 2 hours at temperature and ½ hour cooling-off) the front door is retained in its closed position. During substantially the first hour of the cycle the heat may be supplied continuously to the oven cavity 41; and during the next 1 hour and 20 minutes of the cycle the heat is supplied intermittently, as required, to the oven cavity 41. As previously noted, the heat is supplied to the oven cavity 41 at a rate of about 147 B.t.u. per minute and within the range 120 to 180 B.t.u. per minute. During the cycle the total heat supplied to the oven cavity 41, including that also supplied to the heating element 72 incorporated in the catalytic oxidizing unit 70, is in the general range 9,500 to 23,000 B.t.u. the normal figure being about 15,000 B.t.u. In passing, it is mentioned that the maximum temperature that is produced in the oven cavity should not exceed 950° F. and the minimum temperature for effective heat-cleaning should not fall below about 750° F. The temperature of 880° F. is very satisfactory, since it is within the limits mentioned and yet high enough to effect thorough heat-cleaning in the relatively short time interval of the heat-cleaning cycle, as described above in conjunction with the curves "A," "B" and "C" of FIG. 7.

In the heat-cleaning cycle, a controlled gentle sweep of ambient air proceeds upwardly through the oven cavity 41 and then through the catalytic oxidizing unit 70 and back to the exterior, as previously explained. Thus, some of the food soil products are directly degraded, while other of the food soil products are first oxidized and then degraded, thereby to produce corresponding primary gaseous degradation products in the oven cavity 41; and some of the primary gaseous degradation products are further oxidized in the oven cavity 41 to produce corresponding secondary gaseous degradation products; which effects are enhanced by the supply of the controlled amount of ambient air into the oven cavity 41 during the heat-cleaning cycle. Moreover, these degradation reactions are produced quite uniformly upon all parts of the boundary surfaces of the oven cavity 41; which uniformity is obtained largely by the cooperation of the loop-like unit 63 with the bake unit 62. While the bake unit 62 supplies the major fraction of the heat into the oven cavity in the heat-cleaning cycle, it is the loop-like unit 63 that prevents cool spots upon the liner 40 and upon the inner door sheet 83 adjacent to the junction between the front of the liner 40 and the outer perimeter of the inner door sheet 83 during the heat-cleaning cycle. The above described degradation of the products of the food soils takes place fundamentally by pyrolysis, and without ignition of either the food soil products mentioned or the gaseous primary and secondary degradation products mentioned; whereby there is no "burning" of such products in the oven cavity 41 in the proper chemical sense of this term. At the conclusion of the heat-cleaning cycle, and after the boundary walls cool back to the ambient temperature, there is some residue upon these boundary walls that results from the above-described pyrolysis, which residue appears as an ash or dust upon the boundary walls and may be readily removed by wiping with a dry cloth, in the manner of dusting a table, or the like, since this residue is not adhered to the boundary walls and consists principally of various salts of calcium and like constituents of animal tissue.

Continuing with the present method, the gentle sweep of ambient air through the oven cavity 41 carries the previously mentioned gaseous primary and secondary degradation products, as they are produced, from the oven cavity 41 and into the casing 71 of the catalytic oxidation unit 70, thereby positively to prevent any subsequent condensation of these products upon the boundary walls, and following the completion of the heat-cleaning cycle.

The operation of the catalytic oxidizing unit 70 is very important in the heat-cleaning method, since it is this unit that eliminates the possibility of both soot and carbon monoxide as a result of the pyrolysis that takes place in the oven cavity, as described above. More particularly, free carbon readily coagulates in air to produce soot; however, the unit 70 prevents this possibility by the catalytic oxidation of the free carbon to gaseous carbon dioxide as a result of the contact of the free carbon and the oxygen in the air with the hot catalytic platinum surface of the wire screen structure 73 that is maintained at a temperature of about 1300° F. by the associated energized heating unit 72 that is incorporated in the unit 70. A similar reaction takes place in the event there is any carbon monoxide in the gaseous primary and secondary degradation products; whereby the carbon monoxide is catalytically oxidized to carbon dioxide. Also other of the gaseous primary and secondary degradation products are further degraded to produce gaseous tertiary degradation products. While some of these oxidation reactions are exothermic, there is no ignition of the products in the casing 71 in the ordinary operation of the unit 70; and moreover, any such ignition within the casing 71 is of no moment since it is of small magnitude. Further, upper and lower wire screens 71a and 71b are respectively arranged across the top and the bottom of the flue through the casing 71. These screens 71a and 71b confine the flame within the casing 71, in the event of an ignition of the gaseous products therein; whereby in this event, the flame does not proceed upwardly below the cooking top 12 or downwardly into the oven cavity 41. The gentle stream of gaseous tertiary degradation products and oxidation products are swept from the casing 71 of the unit 70 via the flue 74 and the stack 76 and thence through the adjacent rear surface unit 33 into the kitchen in which the range is located, thereby positively to prevent any subsequent condensation of these products upon the interior walls of the casing 71. The exhausting of the gaseous products from the unit 70 into the kitchen in which the range 10 is located is in no way harmful or objectionable. In the first place, these gaseous products are not essentially harmful; and moreover, the dilution thereof by the kitchen air reduces the concentrations thereof well below an objectionable level thereof. In the second place, these gaseous products contain no readily condensable compound, except water vapor; and the quantity of water vapor thus introduced into the kitchen air does not ordinarily cause the same to reach the dew-point thereof.

Also, it is pointed out the cook should remove from the oven cavity 41, prior to initiating the heat-cleaning operation, any broiling pan, or the like, containing food or accumulated grease, etc.

Further considering the constructional example of the range 10, the oven cavity 41 may have a height between the liner top wall 43 and the liner bottom wall 44 of 15", a width between the liner side walls 45 of 21", and a depth between the liner rear wall 42 and the inner door sheet 83, with the front door 80 in its closed position, of 17". The range 10 has a height between the top of the cooking top 12 and the floor of 36", a width between the casing outer side walls 18 of 30", and a depth between the casing outer rear wall 15 and the outer door sheet 82, with the front door 80 in its closed position, of 24½". The distance between the top of the cooking top 12 and the casing bottom wall 20 may be 23", and the distance between the casing outer rear wall 15 and the casing front wall 14 may be 23¼". The rear flue 17 may have a depth between the casing outer rear wall 15 and the casing inner rear wall 16 of 1½"; and the rear batt 53 may have a compressed thickness of 3". Each of the side flues 23 may have a width between the casing outer side wall 18 and the casing inner side wall 19 of 1½"; and each of the side batts 54 may have a compressed thickness of 3". The bottom batt 52 may have a compressed thickness of 3", and the top batt 51 may have a compressed maximum thickness of 3½" and a compressed minimum thickness of 2½". The distance between the inner door sheet 83 and the outer door sheet 82 may be 3"; and the door batt 85 may have a compressed thickness of 2". Each of the batts 51, etc., comprises 2 stacked loose individual batts, each 4" thick and having a density of 2#/cu. ft.; whereby the 8" of thickness has been compressed approximately to 3" of thickness increasing the density approximately to 5⅓#/cu. ft. Thus, each batt 53, etc., of fibrous glass having a thickness of 3" has a density of 5⅓#/cu.ft.; and the batt 85 having a thickness of 2" has a density of 8#/cu. ft. As a consequence of these relatively thick compressed batts 51, etc., and the flues 17, 23 and 31, and the air pocket 88 in the front door 80, together with the other constructional features, involving the cabinet breaker frame 46 and the front door inner boundry frame 84, causes the oven cavity 41 to be exceeding well heat-insulated. In face, when the oven cavity 41 is operated continuously in the normal cooking temperature range 150° F. to 550° F., the temperatures of the cabinet walls 15, 18, 20 and 21 and of the outer door sheet 82 of the front door 80 do not exceed 130° F. in 70° F. ambient air; whereby the range 10 produces "cool-cooking" in the sense that the carrying out of normal cooking operations in the oven cavity 41 do not "heat-up" the kitchen. On the other hand, when the heat-cleaning cycle is carried out in the oven cavity 41, the temperature therein is elevated into the heat-cleaning temperature range 750° F. to 950° F., and the cycle is carried out in a time interval of about 3 hours, as previously noted; whereby the temperatures of the cabinet walls 15, 18, 20 and 21 do not exceed 194° F. in 70° F. ambient air and the temperature of the outer door sheet 82 of the front door 80 do not exceed 160° F. in 70° F. ambient air. The temperature of 194° F. is the safe temperature below which the paint, or other finish, on a wall of the kitchen, or an adjacent cabinet, cannot be blistered, or otherwise damaged, even through the wall of the range 10 at this temperature is in direct contact therewith. This result is rendered possible by operation of the blower 30, since the circulation of air through the flues 17, 23 and 31 greatly minimizes the temperatures of the cabinet outer rear wall 15 and the cabinet outer side walls 18 that are usually arranged in close proximity to other walls of the kitchen, or of other cabinets in the kitchen. Thus, during the heat-cleaning operation of the range 10 there is no undue heating of the cabinet walls 15, 18, 20 and 21 and of the outer door sheet 82 of the front door 80, although substantial heat is pumped from the range 10 into the kitchen. However, the total heat involved is in the general range 9,500 to 23,000 B.t.u., which is not objectionable over the time interval of approximately 3 hours of the heat-cleaning cycle, as previously explained. The heat-cleaning described immediately above is hereinafter referred to as the "normal" heat-cleaning cycle.

While the cook must initiate the normal heat-cleaning cycle by setting the dials 102 and 90 into the "heat-clean" positions thereof, and must subsequently arrest the normal heat-cleaning cycle by returning the dials 102 and 90 back into their "off" positions, the normal heat-cleaning operation itself proceeds automatically, as far as the cook is concerned. Also, it is noted that the overall time interval recommended is most advantageous to obtain thorough heat-cleaning of the oven cavity 41; and this time interval should not be exceeded, since it is highly desirable that the walls 15 and 18 of the casing of the range 10 should not reach a temperature in excess of 194° F., or the equivalent temperature, as established by the Underwriters' Laboratories, Inc., the temperature "194° F." being the presently established maximum side wall temperature for a household range that is disposed next adjacent to a wooden or like cabinet, previously noted. However, the time interval of the heat-cleaning cycle may be shortened without any particular disadvantageous result, except that it might be necessary to repeat the same in order to obtain thorough heat-cleaning, as is desirable.

In fact, a modified form of the heat-cleaning cycle is especially recommended, particularly when the boundary walls of the oven liner contain only light food soils; which modified form of the heat-cleaning cycle is hereinafter referred to as a "one-shot" heat-cleaning cycle. More particularly, in the "one-shot" heat-cleaning cycle, the heat-cleaning operation is initiated, as previously described; and when the temperature of the oven cavity 41 reaches the given heat-cleaning temperature of about 880° F., the dials 102 and 92 are immediately returned into their "off" positions; whereby the oven cavity 41 immediately begins to cool, and without the holding of the given heat-cleaning temperature throughout a short time interval, as in the previously described "normal" heat-cleaning cycle; which "one-shot" heat-cleaning cycle is represented by the curves "A" and "D" in FIG. 7.

Actually, the "one-shot" cycle and the "normal" cycle are fundamentally the same, since in each case the boundary walls of the oven cavity 41 are heated to a temperature in the heat-cleaning temperature range 750° F. to 950° F. during a time interval that is sufficiently long to obtain the desired degradation of the food soils by pyrolysis, so as to effect the desired heat-cleaning of the boundary walls mentioned.

In order to render substantially entirely automatic the "one-shot" heat-cleaning cycle described immediately above, the temperature controller 100 may be readily modified to incorporate well-known, lock-out structure, not shown, that is rendered active when the dial 102 is set into its "heat-clean" position; whereby the active lock-out structure locks the contact bridging member 105 into its open position the first time it is moved thereto in response to the sensing of the given heat cleaning temperature of 880° F. in the oven cavity 41 by the temperature sensing resistor 104, in the manner previously described. This arrangement positively prevents cycling of the contact bridging member 105, when the dial 102 occupies its "heat-clean" position, so as positively to enforce the "one-shot" heat-cleaning cycle. Of course, when the dial 102 is subsequently operated out of its "heat-clean" position the lock-out structure is released or rendered inactive, in a well known manner. Further, setting of the dial 102 into its other positions ("bake," "time-bake" and "broil") does not render active the lock-out structure mentioned; whereby the contact bridging member 105 is cycled to hold the temperature preset by the dial 102 in the manner previously described.

Reconsidering some of the important constructional details of the range 10, and referring to FIG. 1, in the front door 80, several spaced-apart sheet metal screws 140 are fastened through the inner boundary frame 84 and into the inner liner sheet 83 before the outer sheet or panel 82 is secured to the inner boundary frame 84. The door liner 83 is spaced from the inner boundary frame 84 by heat-insulating washers 141 formed of lava, or the like, so that the spaced screws 140 are the only metal connections between the door liner 83 and the outer door panel 82. The door liner 83 is of shallow pan-like configuration and is proportioned to protrude into the front of the oven liner 40 with small clearances therebetween when the front door 80 occupies its closed position. The front edge of the bottom wall 44 of the oven liner 40 is raised, as indicated at 142, to serve as a dam, thereby to cause liquid spillage to accumulate on the bottom wall 44 rather than to flow under the door liner 83 where it would be difficult to clean in the present heat-cleaning cycle, and thus would require manual labor to scrub the front edge of the bottom wall 44.

Referring to FIG. 3, in the cabinet structure of the range 10, the two gaskets 47 and 48 are respectively wrapped around the upper and lower edges of the breaker frame 46, so as thermally to isolate the frame 46 from metal contact with the oven liner 40 and with the front wall 14 of the casing and with the inner boundary frame 84 of the front door 80. The innermost edge of the breaker frame 46 is fastened by a plurality of spaced-apart screws 143 to the flange 49 surrounding the open front of the liner 40. The outermost edge of the breaker frame 46 that includes the gasket 49 is left unfastened and merely presses against the front wall 14 of the casing. The gasket 47 substantially seals the space between the front wall 14 of the casing and the inner boundary frame 84 of the front door 80. The gasket 48 is supported from the oven liner 40 and it seals against the inner bounadry frame 84 of the front door 80, as well as against the rim of the pan-shaped door liner 83. Thus it will be appreciated that the front of the oven liner 40 does not contact the front wall 14 of the casing, but instead the breaker frame 46 that is thermally isolated by the two gaskets 47 and 48 fills the gap or space between the front of the oven liner 40 and the front wall 14 of the casing.

Referring now to FIGS. 1, 3 and 4, the loop-like heating unit 63 constitutes a mullion heater that is provided to compensate for heat losses at the front door 80, since there are some heat losses thereat, notwithstanding the sealing arrangement previously described and including the two gaskets 47 and 48. Behind the throat heater 63, a heat reflector 144 is arranged and secured in place by a number of spaced-apart screws 145 carried in the front of the liner 40; which reflector 144 directs the heat produced by the throat heater 63 toward the front of the oven liner 40 and away from the walls of the casing.

Thus, it will be appreciated that in order to insure substantially uniform temperatures throughout the boundary walls of the oven cavity 41, during the heat-cleaning cycle, there are provided: the door sealing arrangement (46, 47, 48) thermally isolating the walls of the oven liner 40 from the front wall 14 of the cabinet and from the inner sheet 83 and the inner boundary frame 84 of the front door 80; the auxiliary heater arrangement (63, 144) at the throat or front of the oven liner 40; the relatively thick batts (51, 52, 53, 54) in the cabinet and embedding the oven liner 40; and the relatively thick batt (85), the heat reflectors (86, 87) and the air pocket (88) in the front door 80.

Preferably, the various heating elements 61, 62, 63 and 72, incorporated in the range 10, are of the tubular metal sheath-enclosed resistor type, so that the outer metal sheath thereof in contact with other parts is at ground potential, in the usual manner.

While the foregoing method of heat-cleaning the boundary walls of an oven in a household range has been disclosed in conjunction with the illustrated embodiment of the range 10 that is of the electric type, it will be understood that the method is equally applicable to the heat-cleaning of the boundary walls of an oven incorporated in a gas, or other, household range, since the method is not critically dependent upon the heating medium employed in the household range.

In view of the foregoing it is apparent that there has been provided an improved method of cleaning the boundary walls of an oven cavity in a household cooking oven that involves elevating the temperature of the boundary walls mentioned into the heat-cleaning temperature range extending from about 750° F. to about 950° F. throughout a short time interval, whereby the food soils adhering to the boundary walls mentioned are degraded to produce corresponding gaseous degradation products that are immediately exhausted to the exterior of the oven cavity. In the method, the gaseous degradation products that are exhausted from the oven cavity are passed through a catalytic oxidation unit and thence into the atmosphere in the kitchen in which the cooking oven is located, and in this unit these gaseous degradation products are subjected to catalytic oxidation so as positively to eliminate therefrom any soot-forming free carbon and any possible carbon monoxide. Also, the oven is of improved construction and arrangement from a mechanical standpoint, so as to obtain simple and efficient operations thereof both in the normal cooking operations and in the heat-cleaning operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of cleaning from the interior surfaces of an inner liner defining an oven cavity food soils accumulated thereupon during the previous carrying out in said oven cavity of normal food cooking operations in the normal food cooking temperature range extending from about 150° F. to about 550° F., wherein said inner liner is enclosed by and heat-insulated from an outer casing by high temperature heat-insulating material; said method comprising supplying into said oven cavity during a sufficiently short time interval sufficient heat distributed to elevate the temperature of substantially all of the areas of said inner liner into the heat-cleaning temperature range extending from about 750° F. to about 950° F., but not thereabove, without elevating the temperature of said outer casing above 194° F., whereby the accumulated food soils mentioned are degraded with the production of corresponding gaseous degradation products, and exhausting to the exterior of said oven cavity the gaseous degradation products mentioned as they are produced so as to prevent any subsequent substantial condensation thereof upon the interior surfaces of said inner liner.

2. The method set forth in claim 1, wherein said heat is supplied into said oven cavity during said short time interval at a rate in the general range 120 to 180 B.t.u. per minute.

3. The method set forth in claim 1, wherein the total heat supplied into said oven cavity during said short time interval is in the general range 9,500 to 23,000 B.t.u.

4. The method set forth in claim 1, wherein said heat is supplied into said oven cavity during said short time interval at a rate in the general range 120 to 180 B.t.u. per minute and the total heat thus supplied is in the general range 9,500 to 23,000 B.t.u.

5. The method of cleaning from the interior surfaces of an inner liner defining an oven cavity food soils accumulated thereupon during the previous carrying out in said oven cavity of normal food cooking operations in the normal food cooking temperature range extending from about 150° F. to about 550° F., wherein said inner liner is enclosed by and heat-insulated from an outer casing by high temperature heat-insulating material; said method comprising supplying into said oven cavity during a first time interval of about one hour sufficient heat distributed to elevate the temperature of substantially all of the areas of said inner liner into the heat-cleaning temperature range extending from about 750° F. to about 950° F., but not thereabove, continuing the supply into said oven cavity during a second time interval of about another hour sufficient heat to maintain the temperature of said inner liner in said heat-cleaning temperature range, without elevating the temperature of said outer casing above 194° F., whereby the accumulated food soils mentioned are degraded with the production of corresponding gaseous degradation products, and exhausting to the exterior of said oven cavity the gaseous degradation products mentioned as they are produced so as to prevent any subsequent substantial condensation thereof upon the interior surfaces of said inner liner.

6. The method of cleaning from the interior surfaces of an inner liner defining an oven cavity food soils accumulated thereupon during the previous carrying out in said oven cavity of normal food cooking operations in the normal food cooking temperature range extending from about 150° F. to about 550° F. wherein said inner liner is enclosed by and heat-insulated from an outer casing by high temperature heat-insulating material; said method comprising continuously supplying into said oven cavity during a first time interval sufficient heat distributed to elevate the temperature of substantially all of the areas of said inner liner from an initial temperature disposed well below the heat-cleaning temperature range extending from about 750° F. to about 950° F., but not thereabove, to a control temperature disposed well within said heat-cleaning temperature range, without elevating the temperature of said outer casing about 194° F., terminating the supply of heat into said oven cavity when the temperature of said oven liner is elevated to said control temperature, allowing the temperature of said oven liner gradually to subside during a second time interval from said control temperature back to said initial temperature, whereby the accumulated food soils mentioned are degraded with the production of corresponding gaseous degradation products, and exhausting to the exterior of said oven cavity during said first and second time intervals the gaseous degradation products mentioned as they are produced so as to prevent any subsequent substantial condensation thereof upon the interior surfaces of said inner liner.

7. The method set forth in claim 1, and further comprising blowing a stream of air at ambient temperature over portions of said outer casing during said short time interval so as to extract sufficient heat therefrom to prevent the temperature of said outer casing from being elevated above 194° F. during said short time interval.

8. The method of cleaning from the interior surfaces of an inner liner defining an oven cavity food soils accumulated thereupon during the previous carrying out in said oven cavity of normal food cooking operations in the normal food cooking temperature range extending from about 150° F. to about 550° F., wherein said inner liner is enclosed by and heat-insulated from an outer casing by high temperature heat-insulating material; said method comprising supplying into said oven cavity during a sufficiently short time interval sufficient heat distributed to elevate the temperature of substantially all of the areas of said inner liner into the heat-cleaning temperature range extending from about 750° F. to about 950° F., but not thereabove, without elevating the temperature of said outer casing above 194° F., whereby some of the accumulated food soils mentioned are immediately degraded by pyrolysis and other of the accumulated food soils mentioned are first oxidized and then degraded by pyrolysis so that there are produced primary gaseous degradation products, oxidizing in said oven cavity some of the primary gaseous degradation products mentioned so as to produce therefrom secondary gaseous degradation products that contain substantially no carbon monoxide, and exhausting to the exterior of said oven cavity the secondary gaseous degradation products mentioned as they are produced so as to prevent any subsequent substantial condensation thereof upon the interior surfaces of said inner liner.

9. The method set forth in claim 8, and further comprising admitting into said oven cavity during said short time interval enough outside air to facilitate said oxidization steps named.

10. The method of cleaning from the interior surfaces of an inner liner defining an oven cavity food soils accumulated thereupon during the previous carrying out in said oven cavity of normal food cooking operations in the normal food cooking temperature range extending from about 150° F. to about 550° F., wherein said inner liner is enclosed by and heat-insulated from an outer casing by high temperature heat-insulating material; said method comprising supplying into said oven cavity during a sufficiently short time interval sufficient heat distributed to elevate the temperature of substantially all of the areas of said inner liner into the heat-cleaning temperature range extending from about 750° F. to about 950° F., but not there above, without elevating the temperature of said outer casing above 194° F., whereby the accumulated food soils mentioned are degraded with the production of corresponding initial gaseous degradation products, exhausting to the exterior of said oven cavity and into the interior of a chamber defined by associated structure the initial gaseous degradation products mentioned as they are produced so as to prevent any subsequent substantial condensation thereof upon the interior surfaces of said inner liner, subjecting to catalytic oxidation in said chamber the initial gaseous degradation products mentioned, whereby some of the initial gaseous degradation products mentioned are oxidized so that there are produced final gaseous degradation products that contain substantially no carbon monoxide, and exhausting to the exterior of said chamber the final gaseous degradation products mentioned as they are produced so as to prevent any subsequent substantial condensation thereof upon the interior surfaces of said structure.

11. The method set forth in claim 10, and further comprising admitting into said chamber during said short time interval at least some outside air in order to facilitate said catalytic oxidation step named.

12. The method set forth in claim 1, wherein said degrading of the accumulated food soils takes place fundamentally by pyrolysis, and said pyrolytic step is carried out completely during said short time interval and without ignition of either the accumulated food soils mentioned or the gaseous degradation products mentioned.

13. The method of heat-cleaning the interior boundary surfaces of an oven cavity provided in cooking apparatus, wherein said cooking apparatus includes stationary oven structure having an open front and a front door and means mounting said front door upon said stationary oven structure for movements between open and closed positions with respect to said front opening, said stationary oven structure including a substantially box-like liner and a substantially box-like enclosing casing and first high temperature heat-insulating facility arranged therebetween, said front door including an inner door sheet and an outer door sheet and second high temperature heat-insulating facility arranged therebetween, whereby said interior boundary surfaces mentioned include the interior surfaces of said liner and the interior surface of said inner door sheet with said front door in its closed position, and wherein said heat-cleaning method is employed to clean from said interior boundary surfaces food soils accumulated thereupon during the previous carrying out in said oven cavity of normal food cooking operations in the normal food cooking temperature range extending from about 150° F. to about 550° F.; said method comprising supplying into said oven cavity during a sufficiently short time interval sufficient heat distributed to elevate the temperature of substantially all of the areas of said inner liner and said inner door sheet into the heat-cleaning temperature range extending from about 750° F. to about 950° F., but not thereabove, without elevating the temperature of said outer casing above 194° F. and without elevating the temperature of said outer door sheet above 160° F., retaining said front door in its closed position throughout said short time interval to prevent the development of cool areas upon any portion of said interior boundary surfaces, whereby the accumulated food soils mentioned are degraded with the production of corresponding gaseous degradation products, and exhausting to the exterior of said oven cavity the gaseous degradation products mentioned as they are produced so as to prevent any subsequent substantial condensation thereof upon said interior boundary surfaces.

14. The method set forth in claim 13, and further comprising sweeping a gentle current of ambient air through said oven cavity during said short time interval in order to assist by oxidation said degradation of the accumulated food soils mentioned and to assist by sweeping said exhausting of the gaseous degradation products mentioned to the exterior of said oven cavity.

15. A household cooking oven comprising a substantially box-like metal inner liner provided with top and bottom walls and a pair of side walls and a rear wall and having an open front, said inner liner defining a cooking cavity therein having a volume in the general range 2 to 4 cubic feet, a substantially box-like metal outer casing provided with top and bottom walls and a pair of side walls and a rear wall and having an open front, said inner liner being arranged within said outer casing with said casing front opening surrounding said liner front opening and with said five named inner liner walls respectively spaced inwardly with respect to the corresponding ones of said five named outer casing walls, heat-insulating breaker structure joining the front of said casing and the front of said liner, fibrous glass heat-insulating material disposed in the five spaces respectively arranged between said five named casing walls and the corresponding ones of said five named liner walls, means defining a rear flue between said rear casing wall and said rear liner wall and immediately adjacent to said rear casing wall, means defining a pair of side flues respectively between said side casing walls and said side liner walls and respectively immediately adjacent to said side casing walls, a blower operative to circulate ambient air from the exterior downwardly through said rear flue and thence upwardly through both of said side flues and back to the exterior, means for operating said blower, a heat-insulated front door operatively associated with the front opening into said cooking cavity and selectively movable between open and closed positions with respect thereto, gasket structure substantially sealing the front opening into said cooking cavity when said front door occupies its closed position, means for supplying heat into said cooking cavity, and means for controlling said heat-supplying means to preset the temperature within said cooking cavity when said front door occupies its closed position either in a normal cooking temperature range extending from about 150° F. to about 550° F., or in a heat-cleaning temperature range extending from about 750° F. to about 950° F.; said fibrous glass heat-insulating material having a thickness and a density such that continuous operation of said cooking cavity in said normal cooking temperature range and in the absence of operation of said blower does not cause elevation of the temperature of any one of said five named casing walls above about 130° F. in 70° F. ambient air and such that operation of said cooking cavity in said heat-cleaning temperature range concurrently with operation of said blower and throughout a time interval of about 3 hours does not cause elevation of the temperature of any one of said five named casing walls above 194° F. in 70° F. ambient air.

16. The household cooking oven set forth in claim 15, wherein said fibrous glass heat-insulating material has a thickness of at least about 3 inches and a density of at least about 5 pounds per cubic foot.

17. A household cooking oven comprising substantially box-like heat-insulated cabinet structure defining a cooking cavity therein and provided with an open front, said cooking cavity having a volume in the general range 2 to 4 cubic feet, a heat-insulated front door operatively associated with the front opening into said cooking cavity and selectively movable between open and closed positions with respect thereto, gasket structure substantially sealing the front opening into said cooking cavity when said front door occupies its closed position, means for supplying heat into said cooking cavity, and means for controlling said heat-supplying means to preset the temperature within said cooking cavity when said front door occupies its closed position either in a normal cooking temperature range extending from about 150° F. to about 550° F. or in a heat-cleaning temperature range extending from about 750° F. to about 950° F.; said front door including an inner metal sheet and an outer metal sheet arranged in spaced-apart relation, heat-insulating breaker structure joining the perimeters of said front door sheets, and fibrous glass heat-insulating material disposed in the space arranged between said front door sheets, said fibrous glass heat-insulating material having a thickness and a density such that continuous operation of said cooking cavity in said normal cooking temperature range does not cause elevation of the temperature of said outer front door sheet above about 130° F. in 70° F. ambient air and such that operation of said cooking cavity in said heat-cleaning temperature range throughout a time interval of about 3 hours does not cause elevation of the temperature of said outer front door sheet above about 160° F. in 70° F. ambient air.

18. The household cooking oven set forth in claim 17, wherein said fibrous glass heat-insulating material has a thickness of at least about 2 inches and a density of at least about 6 pounds per cubic foot.

19. In a household cooking oven including heat-insulated structure defining a cooking cavity therein having a front opening, a heat-insulated front door operatively associated with said front opening and selectively movable between open and closed positions with respect thereto, and a source of electric power supply; the combination comprising a first heating circuit adapted to be completed to said power source to supply heat at a relatively high rate to said cooking cavity, a second heating circuit adapted to be completed to said power source to supply heat at a relatively low rate to said cooking cavity, a selector switch having an "off" position and a "bake" position and a "heat-clean" position, said selector switch in its "off" position interrupting both of said circuits, said selector switch in its "bake" position preparing said first heating circuit, said selector switch in its "heat-clean" position preparing said second heating circuit, a manually settable temperature control device having a variable "bake" position and a fixed "heat-clean" position, said temperature control device in its variable "bake" position correspondingly presetting a variable bake temperature for said cooking cavity in the normal cooking temperature range extending from about 150° F. to about 550° F., said temperature control device in its fixed "heat-clean" position presetting a given heat-cleaning temperature for said cooking cavity in the heat-cleaning temperature range extending from about 750° F. to about 950° F., switching mechanism selectively operative to open and to close a prepared one of said heating circuits, and control means governed jointly by the temperature of said cooking cavity and by the temperature preset by said temperature control device for selectively operating said switching mechanism, wherein said switching mechanism is operated to close the prepared one of said heating circuits when the temperature of said cooking cavity is below that preset by said temperature control device and to open the prepared one of said heating circuits when the temperature of said cooking cavity is above that preset by said temperature control device.

20. A cooking apparatus comprising an outer supporting structure, walls forming an oven cavity, one wall of the cavity including a door for gaining access thereto, heat-insulating material surrounding the oven cavity for retaining the heat therein, heating means for the cavity for supplying heat for cooking food placed therein, and cleaning means operable also for the automatic cleaning of the inner surface of the walls of the cavity by using the heating means to heat said walls gradually to an elevated temperature materially above the maximum cooking range of temperatures of about 550° F. to a heat-cleaning temperature between about 750° F. and 950° F. so as to degrade food soil adhering to the inner surfaces of the walls, door insulating means capable of withstanding the elevated temperatures and minimizing the flow of heat adjacent the door from the walls of the oven cavity to the outer supporting structure, and additional heating means located adjacent to the door opening and usable in the elevated temperature range to replenish the heat lost adjacent the door opening and co-acting with said first heating means to maintain substantially uniform inner wall surface temperatures throughout all of the cavity walls, said cleaning means including means controlling the heating means for normal cooking operations and for the high temperature heat cleaning operation.

21. A cooking apparatus as recited in claim 20, wherein said door is provided with an outer panel and with an inner metal liner spaced inwardly from the outer panel so that it protrudes into said cavity, and fastening means fastening said liner to said panel at a comparatively few spaced connection points to hold the liner in its position spaced from said panel and to afford only said few points through which heat may flow by conduction from the liner to the panel, said additional heating means substantially encircling the portion of the inner door liner which protrudes into the oven cavity to compensate for the heat lost in the vicinity of the door.

22. A cooking apparatus as recited in claim 21, wherein the outermost side of the inner liner of the door is provided with a reflective surface substantially coextensive with it, and a second reflective surface cooperating with the first said surface to define a dead air space within the oven door to reduce the radiation of heat from the liner through the door.

23. A cooking apparatus as recited in claim 20, wherein the oven cavity is formed by an oven liner having a bottom wall, vertical side walls, a top wall, a back wall, and an open front which is closed by the door, said additional heating means being represented by a metal-sheathed tubular heating element that extends substantially around the periphery of the front opening to compensate for the heat losses around the door and to obtain even temperature distribution within all said walls of the oven liner.

24. A cooking apparatus as recited in claim 23, wherein a heat reflector paralleling the tubular heating element is provided to direct heat back toward the oven liner.

25. An oven comprising walls defining a bake and broil compartment, heating means for said compartment for establishing bake and broil cooking operations, control means for said heating means selectably operable to control the heating means to effect either a bake operation or a broil operation, temperature control means for said heating means settable to control the heating means when in a bake operation to hold selected baking temperatures within a baking temperature range, and cleaning means for said walls for degrading food and grease deposits thereon, said cleaning means including said control means settable to control said heating means to supply heat energy to said compartment at a rate materially lower than the rate at which heat energy is supplied for a baking operation and also including said temperature control means settable to permit a temperature rise in said oven to a predetermined level within the range from 750° F. to 950° F.

26. An electric oven comprising an oven liner and a door that forms an oven cooking cavity, heating means for said cavity including an upper electrical broil heating unit, a lower electrical bake heating unit, and a third heating unit coextensive with at least part of the oven liner adjacent the door, and control means for said heating means settable to controlling conditions in one of which it connects said lower bake unit and said third heating unit in a series energizing circuit to raise the temperature in the oven cavity to a degree where food soil lodged on the oven cavity walls will be degraded and the oven will, in effect, be self-cleaning.

27. An electric oven as recited in claim 26, wherein said third heating unit substantially completely encircles the outside of the oven liner adjacent the door to replenish the heat lost through and around the door so that the walls of the oven cavity will operate at substantially the same temperature during the heat-cleaning cycle.

28. An electric oven as recited in claim 27, wherein said oven door is provided with an inner door liner that protrudes into the front of the oven liner and means are provided substantially to thermally isolate said inner liner from the door to reduce the heat loss by conduction through the door, said third heating unit likewise encircling the portion of the inner door liner which protrudes into the oven liner.

29. An electric oven as recited in claim 28, wherein fastening means are provided to attach the inner door liner to the door at only a few fastening points in order to reduce the conduction of heat from the liner to the door, and a heat reflective surface interposed between the door liner and the door to reduce the radiation of heat from the liner to the door.

30. An electric oven as recited in claim 29, wherein a thermal insulating gasket is mounted around the front of the oven liner to seal against the inner door liner as well as the door proper in order to reduce the smoke and odor and heat loss around the door.

31. An electric oven as recited in claim 30, with the addition of a silicone rubber gasket arranged parallel to the first named gasket and outside thereof to seal between the oven and the door and restrict the heat loss from around the door.

32. A cooking apparatus comprising walls forming an oven cavity, one wall of the cavity including a door for gaining access thereto, heating means supplied for the cavity, and cleaning means operable for the automatic cleaning of the inner wall of the cavity by causing the heating means to raise the temperature of the cavity to a maximum temperature in the range of from 750° F. to 950° F. in a one-shot operation and thereby degrade food soil adhering to the cavity walls, means controlling said heating means to heat said cavity to within said temperature range, the inner wall of the door being provided with a metal liner that protrudes into the cavity, and means supporting said inner wall in its protruding position from the door by a series of spaced fastening points of relatively low heat conductivity in order to reduce the conduction of heat from the door liner to the door and insure substantially uniform temperatures of the inner surfaces of the walls of the oven cavity.

33. A cooking apparatus as recited in claim 32, wherein at least one reflective surface of thin metal sheet is positioned between the door liner and the door to reduce the radiation of heat from the liner through the door.

34. A cooking apparatus as recited in claim 33, with the addition of a second reflective surface between the door and door liner to form a dead air space within the door and bounded by the said two reflective surfaces.

35. A cooking apparatus as recited in claim 32, provided with walls forming an outer cabinet enclosing said oven cavity and wherein the oven cavity is formed by an oven liner and the door, the oven liner having a bottom wall, two vertical side walls, a top wall, a back wall, and a front opening that is closed by the door, the front edge of the oven liner that surrounds the front opening being provided with a breaker frame extending outwardly from said opening and which carries a fiberglass gasket surrounding its innermost edge, and a silicone rubber gasket surrounding the outermost edge, the two gaskets serving to insulate the breaker frame from the oven liner and the door liner and the door and the walls of said cabinet.

36. A cooking apparatus as recited in claim 35, wherein fastening means constituting the sole support for said breaker frame are provided between the breaker frame and the front edge of the oven liner.

37. A cooking apparatus as recited in claim 36, wherein the fiberglass gasket seals between the oven liner and the door liner and the door, while the silicone rubber gasket seals between the inner surface of the door and said cabinet.

38. A cooking apparatus as recited in claim 35, with the addition of a heating element that substantially coincides with the front edge of the oven liner to replenish the heat lost through and around the door and to obtain a substantially uniform temperature distribution throughout the oven cavity.

39. A cooking apparatus as recited in claim 38, wherein said heating element completely encircles the outside surface of the front edge of the oven liner.

40. A cooking apparatus as recited in claim 39, with the addition of a reflector strip paralleling said heater element to direct its heat toward the oven liner.

References Cited in the file of this patent

UNITED STATES PATENTS

| | | |
|---|---|---|
| 1,418,594 | Maehler | June 6, 1922 |
| 1,784,753 | Rogers | Dec. 9, 1930 |
| 2,063,407 | Smith | Dec. 8, 1936 |
| 2,224,945 | Ames | Dec. 17, 1940 |
| 2,247,626 | Ames | July 1, 1941 |
| 2,300,837 | Ames | Nov. 3, 1942 |
| 2,367,007 | Cossin | Jan. 9, 1945 |
| 2,408,295 | Cossin | Sept. 24, 1946 |
| 2,415,768 | Shaw | Feb. 11, 1947 |
| 2,617,008 | Ames | Nov. 4, 1952 |
| 2,900,483 | Welch | Aug. 18, 1959 |
| 2,922,018 | Walkoe | Jan. 19, 1960 |
| 2,939,452 | Kamin | June 7, 1960 |

UNITED STATES PATENT OFFICE
CERTIFICATE OF CORRECTION

Patent No. 3,121,158                                February 11, 1964

Bohdan Hurko

It is hereby certified that error appears in the above numbered patent requiring correction and that the said Letters Patent should read as corrected below.

Column 2, line 22, for "dor" read -- door --; column 9, line 3, for "time-brake" read -- time-bake --; column 17, line 27, for "about" read -- above --.

Signed and sealed this 23rd day of June 1964.

(SEAL)
Attest:

ERNEST W. SWIDER                                       EDWARD J. BRENNER
Attesting Officer                                            Commissioner of Patents